United States Patent
Okada et al.

(10) Patent No.: US 7,030,509 B2
(45) Date of Patent: Apr. 18, 2006

(54) APPARATUS AND METHOD FOR CONTROLLING MOVEMENT OF A MOVABLE MEMBER

(75) Inventors: Kazukiyo Okada, Kosai (JP); Yoshinobu Toyoda, Toyokawa (JP); Takayuki Nakamura, Hamamatsu (JP)

(73) Assignee: Asmo Co., Ltd., Shizuoka-ken (JP)

( * ) Notice: Subject to any disclaimer, the term of this patent is extended or adjusted under 35 U.S.C. 154(b) by 538 days.

(21) Appl. No.: 10/213,901

(22) Filed: Aug. 7, 2002

(65) Prior Publication Data
US 2003/0052537 A1  Mar. 20, 2003

(30) Foreign Application Priority Data
Aug. 9, 2001  (JP)  ............................. 2001-241744

(51) Int. Cl.
*B60J 7/057* (2006.01)

(52) U.S. Cl. ...................... 307/10.1; 296/223; 318/286

(58) Field of Classification Search ................. 296/223, 296/221; 307/10.1; 318/455
See application file for complete search history.

(56) References Cited

U.S. PATENT DOCUMENTS

| | | | | |
|---|---|---|---|---|
| 4,514,670 A | * | 4/1985 | Fassel et al. ................ | 318/467 |
| 4,556,835 A | * | 12/1985 | Vogel et al. ................ | 318/663 |
| 4,835,449 A | * | 5/1989 | Huehn ........................ | 318/282 |
| 4,983,892 A | * | 1/1991 | Suga et al. .................. | 318/98 |
| 5,098,152 A | * | 3/1992 | Sakai ......................... | 296/223 |
| 5,185,562 A | * | 2/1993 | Huyer ........................ | 318/466 |
| 5,723,960 A | * | 3/1998 | Harada ....................... | 318/469 |
| 5,749,617 A | * | 5/1998 | Weissrich et al. ...... | 296/107.19 |
| 5,912,537 A | * | 6/1999 | Yang .......................... | 318/280 |
| 6,194,857 B1 | * | 2/2001 | Stolz .......................... | 318/466 |
| 6,572,184 B1 | * | 6/2003 | Bauer et al. ................ | 296/223 |
| 6,761,396 B1 | * | 7/2004 | Ohtsu et al. ................ | 296/221 |

* cited by examiner

*Primary Examiner*—Brian Sircus
*Assistant Examiner*—Andrew Deschere
(74) *Attorney, Agent, or Firm*—Synnestvedt & Lechner LLP (57) ABSTRACT

A control apparatus for a roof glass specifies the selection position of the selection switch when an output voltage from the selection switch is determined to be included in any of the allowable ranges predetermined respectively for the selection positions of the selection switch. The selection position of the selection switch is settled when the specified selection position has not changed even when a predetermined time passes after specifying of the selection position of the selection switch. When those selection positions which have been settled at a time of making the current decision and at a time of making a previous decision satisfy predetermined conditions, the roof glass is allowed to operate to a position corresponding to the selection position of the selection switch settled at a time of making a current decision.

12 Claims, 6 Drawing Sheets

APPARATUS AND METHOD FOR CONTROLLING MOVEMENT OF A MOVABLE MEMBER

BACKGROUND OF THE INVENTION

The present invention relates to a control apparatus and control method which control the operation of a movable member, such as the roof glass, window glass or slide door of an automobile.

DESCRIPTION OF THE RELATED ART

Various sunroof apparatuses to be equipped on automobiles have been proposed, each of which slides the roof glass to any of preset plural positions based on the rotational operation of a preselect switch, comprised of a rotary switch, to open the skylight of the automobile. Such a preselect switch has a variable resistor which changes the resistance according to the selection position of the switch. The variable resistor outputs a voltage according to the selection position of the switch so that the roof glass slides to each position corresponding to the value of that voltage.

However, there may be a case where the resistance of the variable resistor varies due to electromigration and a case where the value of the output voltage of the variable resistor is changed by the influence of an external electromagnetic wave. When the output voltage of the variable resistor changes in such a manner, the roof glass may be actuated against the intention of a user although the preselect switch is not operated. In this case, the user would have awkward feeling.

SUMMARY OF THE INVENTION

The invention has been devised to overcome the problem and aims providing control apparatus and control method for a movable member, which prevent disturbance-originated malfunction of the movable member to thereby suppress the awkward feeling a user would otherwise have.

According to one aspect of the present invention, there is provided a control apparatus for a movable member, which comprises the following components. A movable member is movable between a fully-open position to fully open an opening of a frame and a fully-closed position to fully close the opening of the frame and selectively placeable in a plurality of positions between the fully-open position and the fully-closed position. A drive motor actuates the movable member. A detection device detects a position of the movable member. A selection switch is operated to place the movable member in any one of the plurality of positions, and is changed over to selection positions corresponding to the plurality of positions. The selection switch outputs voltages of different levels in accordance with the selection positions. Control means controls the drive motor to actuate the movable member movable member in accordance with the position of the movable member detected by the detection device and a selection position of the selection switch position. The control means specifies the selection position of the selection switch when an output voltage from the selection switch is determined to be included in any of allowable ranges predetermined respectively for the selection positions of the selection switch, settles the selection position of the selection switch when the specified selection position has not changed even when a predetermined time passes after specifying of the selection position of the selection switch, and permits actuation of the movable member to a position corresponding to the selection position of the selection switch settled at a time of making a current decision when those selection positions which have been settled at a time of making the current decision and at a time of making a previous decision satisfy predetermined conditions.

According to another aspect of the present invention, there is provided a control method for placing in a desired position a movable member, which is movable between a fully-open position to fully open an opening of a frame and a fully-closed position to fully close the opening of the frame and is selectively placeable in a plurality of positions between the fully-open position and the fully-closed position, based on an operation of a selection switch which outputs voltages of different levels in accordance with the selection positions. When an output voltage from the selection switch is determined to be included in any of the allowable ranges predetermined respectively for the selection positions of the selection switch, the selection position of the selection switch is specified. The selection position of the selection switch is settled when the specified selection position has not changed even when a predetermined time passes after specifying of the selection position of the selection switch. When those selection positions which have been settled at a time of making the current decision and at a time of making a previous decision satisfy predetermined conditions, the movable member is allowed to be actuated to a position corresponding to the selection position of the selection switch settled at a time of making a current decision.

DETAILED DESCRIPTION OF THE PREFERRED EMBODIMENT

One preferred embodiment of the present invention will now be described with reference to the accompanying drawings.

Figure 6:
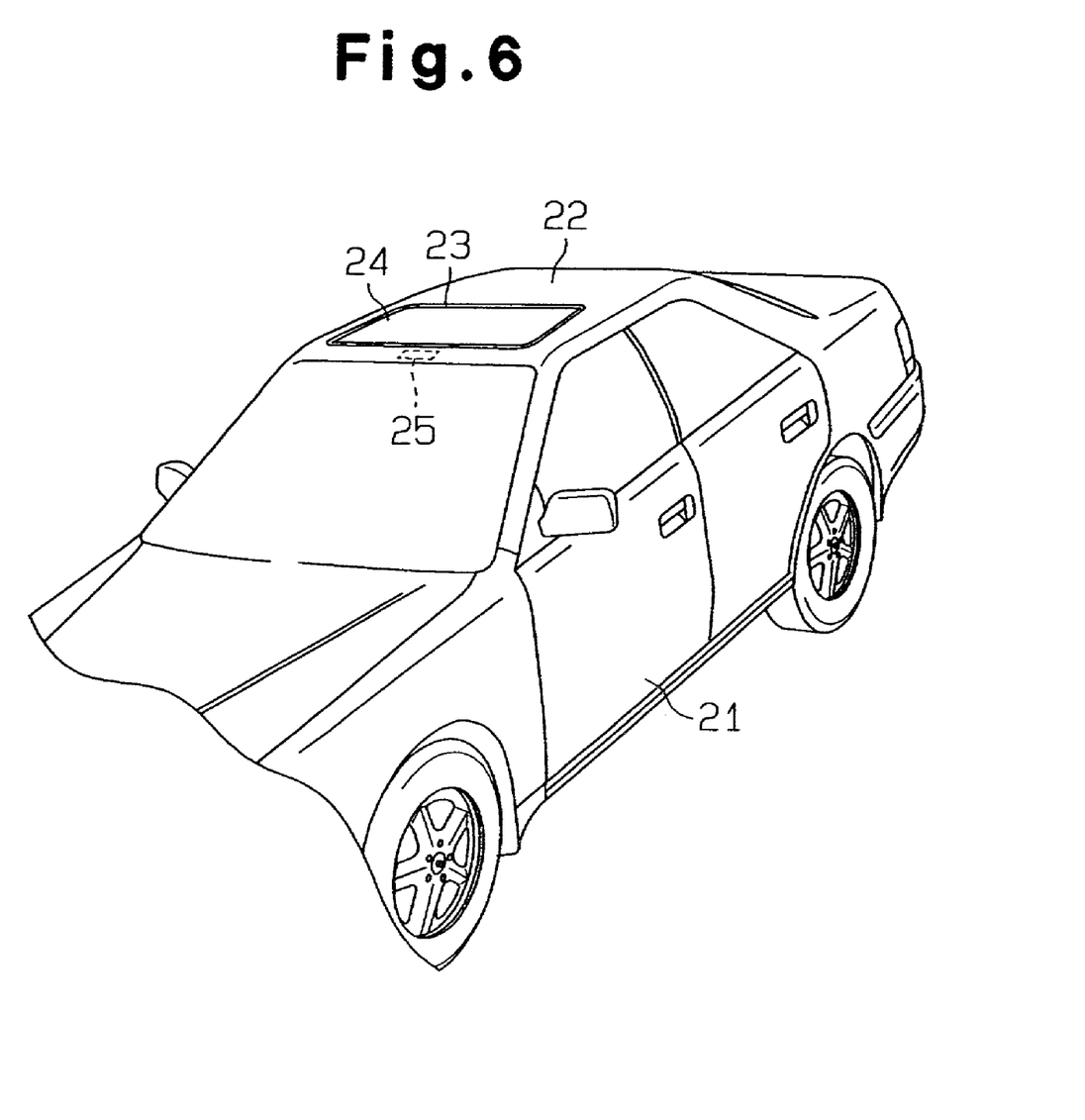
FIG. 6 is a perspective view of the essential portions of an automobile equipped with a sunroof apparatus.

FIG. 6 is a perspective view of the essential portions of an automobile equipped with a sunroof apparatus. A roof glass 24 as a movable member is provided in a skylight 23 or an opening, which is formed in a roof panel 22 in the frame of an automobile 21. The roof glass 24 is slidable back and forth and tiltable about the axial line extending in the widthwise direction of the automobile at the front end portion. The roof glass 24 is actuated by a drive motor 25, indicated by the broken line in FIG. 6, via an unillustrated drive transmission mechanism. The drive motor 25, together with a control circuit 11 for controlling the motor 25, constitutes a drive unit 10. The drive unit 10 is laid out in front of the skylight 23 between a roof panel 22 and the ceiling panel (not shown) in the room.

Figure 2:
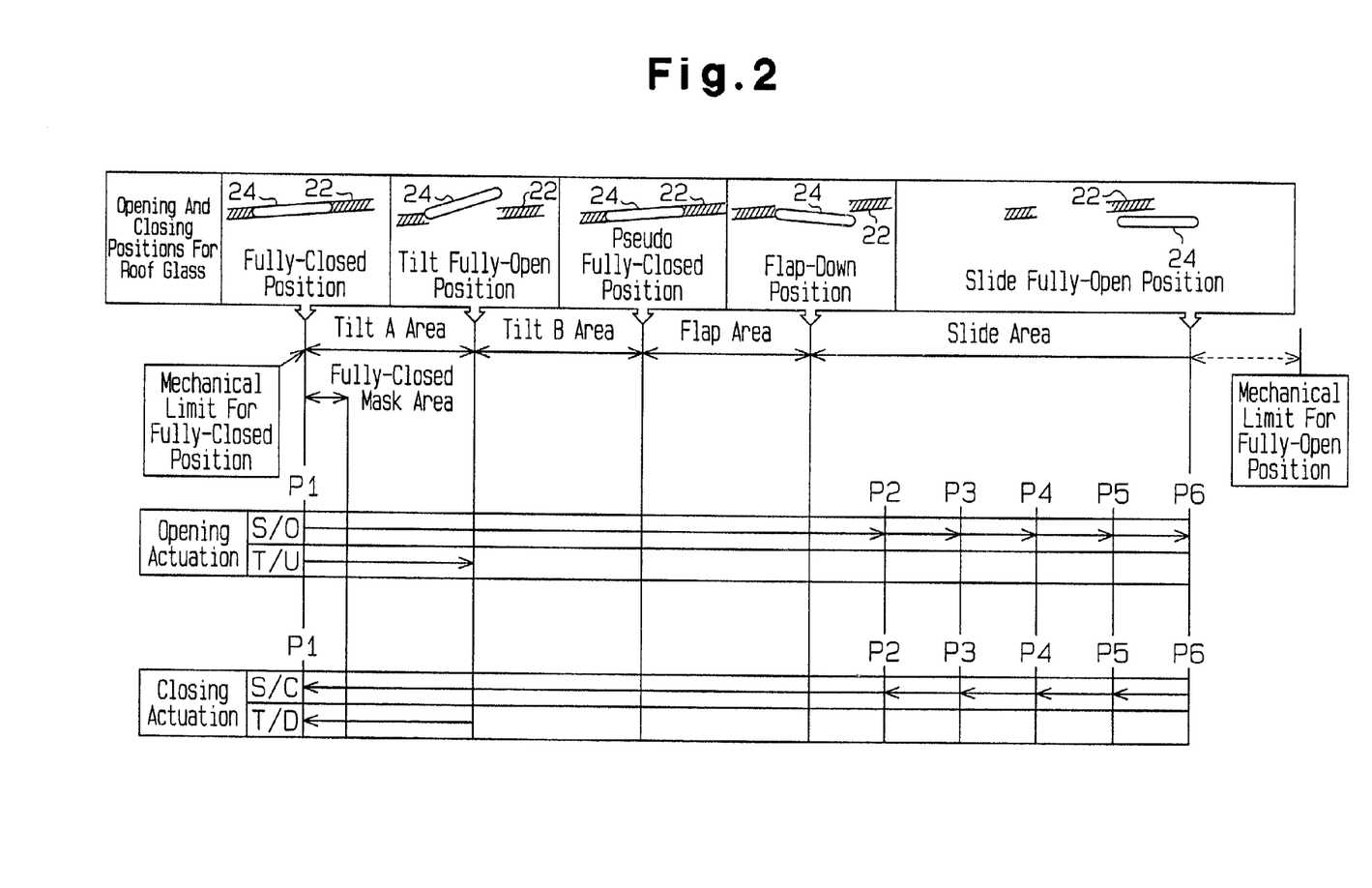
FIG. 2 is a diagram for explaining operations to open and close a roof glass.

As shown in FIG. 2, the roof glass 24 according to the embodiment has a fully-closed position, a tilt fully-open position, a pseudo fully-closed position, a flap-down position and a slide fully-open position. The roof glass 24 in the fully-closed position closes the entire skylight 23. When the roof glass 24 is slid and placed in the slide fully-open position, the roof glass 24 opens the skylight 23 entirely. The tilt fully-open position is the position where the rear end of the roof glass 24 rises most outward of the room. The flap-down position is the position where the rear end of the roof glass 24 goes down most inside the room. The pseudo fully-closed position is the position where the rear end of the roof glass 24 meets the rear end of the skylight 23 during shifting to the flap-down position from the tilt fully-open position, so that the roof glass 24 is placed as if the skylight 23 were closed, and where the rear end of the roof glass 24 passes instantaneously.

In the present embodiment, the actuation of the roof glass 24 to shift from the fully-closed position and pass the tilt fully-open position, the pseudo fully-closed position, the flap-down position and the slide fully-open position in order is called "slide opening" (S/O actuation in FIG. 2) and the reverse actuation is called "slide closing" (S/C actuation in FIG. 2).

In the present embodiment, the fully-closed position is indicated by "P1" and the slide fully-open position by "P6". Four intermediate positions "P2" to "P5" are set so as to substantially equally divide the slide area from the flap-down position to the slide fully-open position into five sections. The positions "P1" to "P6" at the time of the slide opening/closing operation are selected by placing a preselect switch SW2 to selection positions corresponding to the positions "P1" to "P6" (Q1 to Q6 in FIG. 3(a)).

In the present embodiment, the actuation of the roof glass 24 from the fully-closed position to the tilt fully-open position is called "tilt opening" (T/U actuation in FIG. 2) and the reverse actuation is called "tilt closing" (T/D actuation in FIG. 2). The tilt-opening actuation and closing actuation is carried out by manipulating a tilt open switch SW3 and a tilt close switch SW4, respectively.

Figure 1:
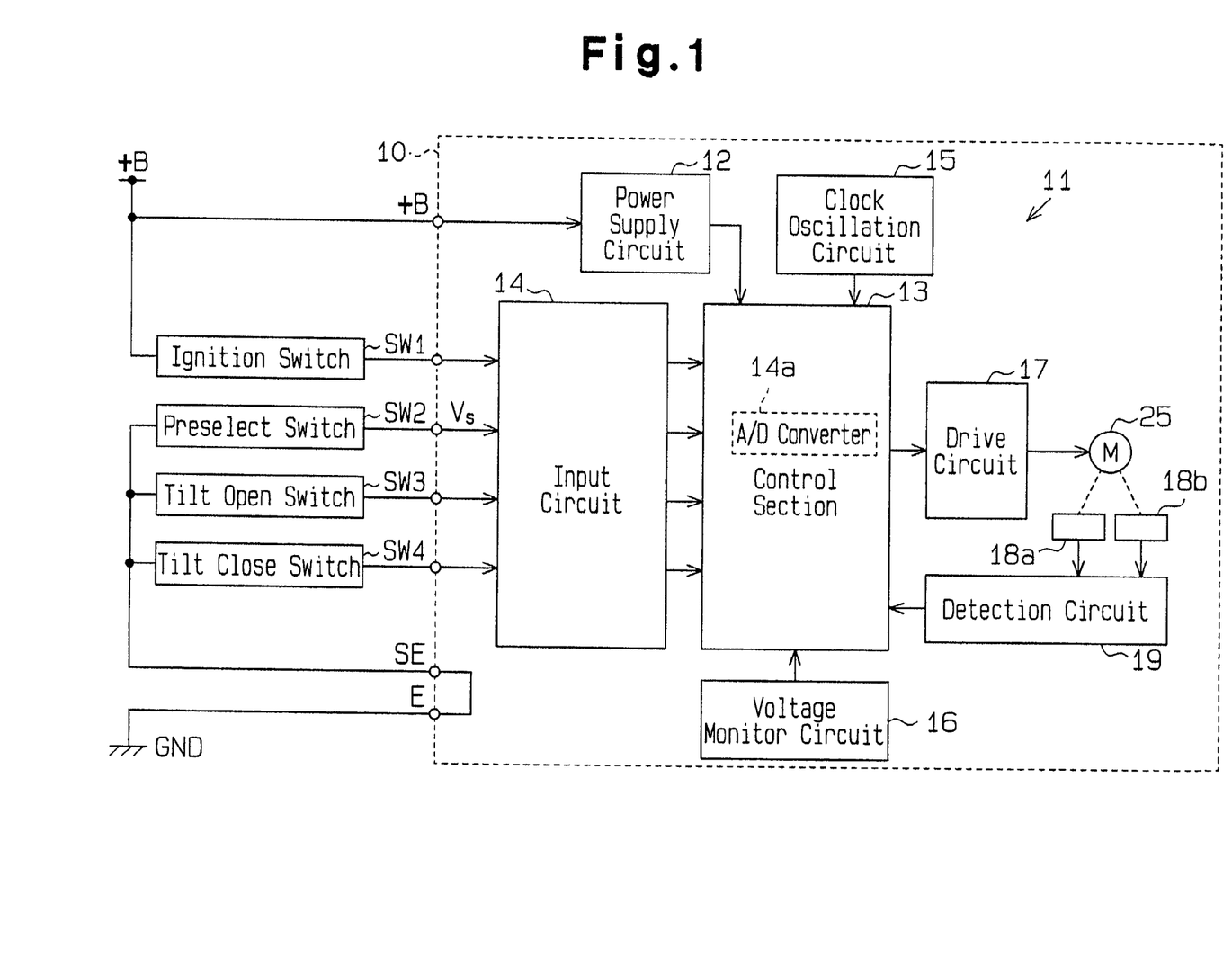
FIG. 1 is a block circuit diagram of a sunroof apparatus according to one embodiment of the present invention.

FIG. 1 is a block circuit diagram for explaining the electric structure of a sunroof apparatus. The control circuit 11 for controlling the drive motor 25 is connected to a battery (not shown) and is supplied with a drive voltage +B from the battery. The drive voltage +B is adjusted to a predetermined supply voltage in a power supply circuit 12 in the control circuit 11, which is then supplied to a control section 13.

An ignition switch SW1 is connected to the control circuit 11. The ignition switch SW1 is connected to the control section 13 via an input circuit 14 in the control circuit 11. The ignition switch SW1, when operated, outputs an operation signal (ON signal) to the control section 13 via the input circuit 14. In response to the ON signal from the ignition switch SW1, the control section 13 operates based on the drive voltage supplied from the power supply circuit 12.

Various other switches for operating the roof glass 24, namely, the preselect switch SW2, tilt open switch SW3 and tilt close switch SW4, are connected to the control circuit 11. The switches SW2 to SW4 are connected to the control section 13 via the input circuit 14 in the control circuit 11.

Figure 3A:
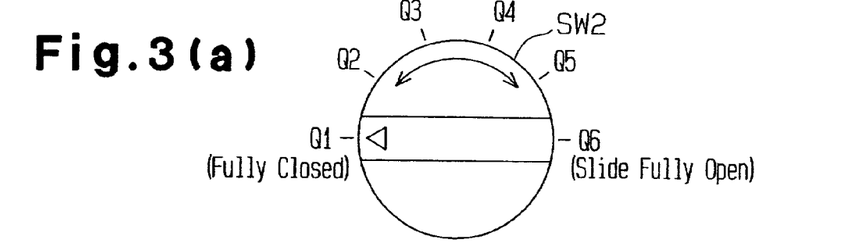
FIG. 3(a) is a diagram showing a preselect switch.
Figure 3B:
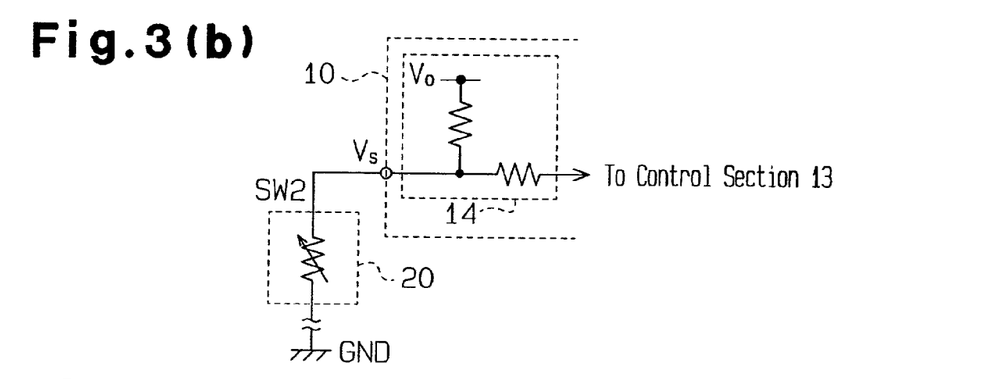
FIG. 3(b) is a diagram showing the circuit structure of the switch.
Figure 3C:
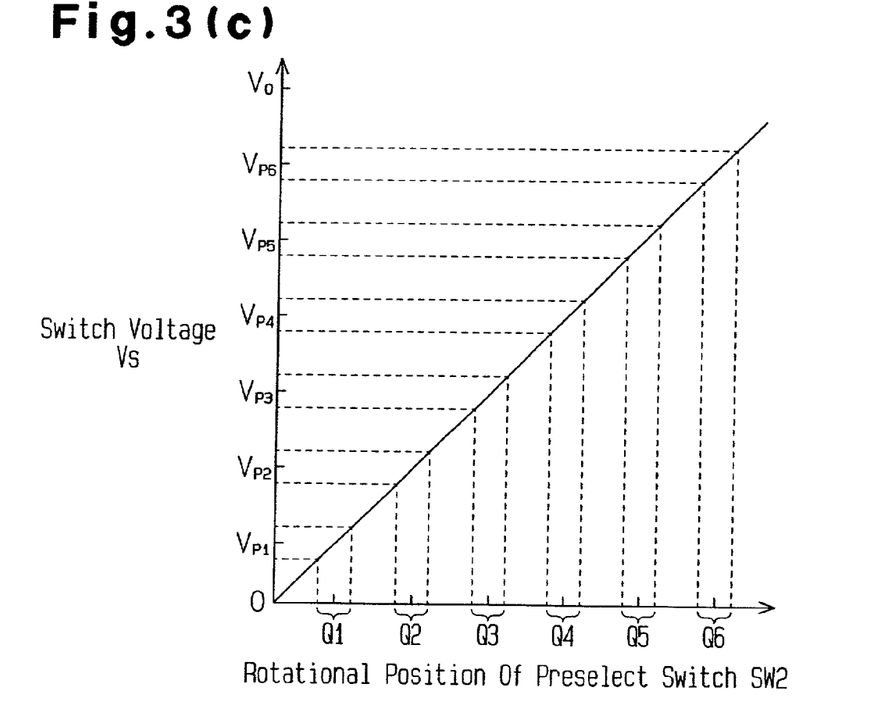
FIG. 3(c) is a graph showing the relationship between the rotational position of the preselect switch and a switch voltage.

The preselect switch SW2 is comprised of a rotary switch as shown in FIG. 3(a) and is designed to be held in the six selection positions (Q1 to Q6). The preselect switch SW2 has a variable resistor 20 as shown in FIG. 3(b) whose resistance changes in accordance with the selection position (any of Q1 to Q6) of the switch SW2. The preselect switch SW2 divides a voltage V0 according to each selection position and outputs a switch voltage Vs whose value differs according to each selection position to the input circuit 14 as shown in FIG. 3(c). In this case, as the switch SW2 is selectively changed over to each of the positions Q1 to Q6, the value of the switch voltage Vs is selectively set to one of values "$V_{P1}$" to "$V_{P6}$". The control section 13 has an A/D converter 14a which performs A/D conversion of the input switch voltage Vs.

Each of the tilt open switch SW3 and the tilt close switch SW4, when operated, sends an instruction signal (an ON signal with an L level (ground level) in the present embodiment) to the control section 13 via the input circuit 14.

A reference clock signal needed for the operation of the control section 13 is input to the control section 13 from a clock oscillation circuit 15. A voltage monitor circuit 16 monitors the drive voltage supplied from the power supply circuit 12. The control section 13 supplies the drive voltage to the drive motor 25 via a drive circuit 17 and controls the motor 25.

When the preselect switch SW2 is turned and a voltage value obtained by A/D conversion of the switch voltage Vs according to the selection position of the switch SW2 is input to the control section 13 in the present embodiment, the control section 13 determines in which one of the selection positions (Q1 to Q6) the switch SW2 is placed, based on the voltage value. In this case, as indicated by the broken line in FIG. 3(c), allowable ranges are set on the positive side and the negative side of each of the voltage values "$V_{P1}$" to "$V_{P6}$". If the input voltage value lies in any allowable range, therefore, the control section 13 determines that the switch SW2 has been placed in one of the selection positions (Q1 to Q6). Non-allowable ranges are set among the allowable ranges of the individual selection positions (Q1 to Q6) of the switch SW2. Those non-allowable ranges include the minimum voltage "0" and the maximum voltage "V0" of the supplied voltage V0.

The control section 13 supplies the drive voltage to the drive motor 25 and drives the motor 25 to automatically open or automatically close the roof glass 24 from the current position, any one of P1 to P6 (see FIG. 2), to a target position (any one of P1 to P6) selected by the switch SW2. When it is detected that the roof glass 24 is placed in any of the target positions P1 to P6, the control section 13 stops supplying the drive voltage to the drive motor 25 to stop the actuation of the roof glass 24.

While the tilt open switch SW3 is being operated, i.e., while receiving the ON signal from the switch SW3, the control section 13 supplies the drive voltage to the drive motor 25 and drives the motor 25 to open the roof glass 24. This actuation is called "manual opening". When the operation of the tilt open switch SW3 is stopped and an OFF signal is input to the control section 13 from the switch SW3, the control section 13 stops supplying the drive voltage to the drive motor 25 to stop the actuation of the roof glass 24. In this case, when it is detected that the roof glass 24 is placed in the tilt fully-open position, the control section 13 stops supplying the drive voltage to the drive motor 25 to stop the actuation of the roof glass 24 even during the operation of the tilt open switch SW3.

While the tilt close switch SW4 is being operated, i.e., while receiving the ON signal from the switch SW4, the control section 13 supplies the drive voltage to the drive motor 25 and drives the motor 25 to close the roof glass 24 in accordance with that ON signal. This actuation is called "manual closing". When the operation of the tilt close switch SW4 is stopped and an OFF signal is input to the control section 13 from the switch SW4, the control section 13 stops supplying the drive voltage to the drive motor 25 to stop the actuation of the roof glass 24. In this case, when it is detected that the roof glass 24 is placed in the fully-closed position, the control section 13 stops supplying the drive voltage to the drive motor 25 to stop the actuation of the roof glass 24 even during the operation of the tilt close switch SW4.

First and second magnetic sensors 18a and 18b each comprised of a pair of Hall elements to detect the rotational period (rotational speed) and rotational direction of the drive motor 25 are provided on the circuit board of the control circuit 11. Specifically, a sensor magnet which has a plurality of S poles and N poles arranged alternately in the rotational direction of the rotary shaft (not shown) of the drive motor 25 are provided on the rotary shaft in such a way that the sensor magnet rotates together with the rotary shaft, and the first and second magnetic sensors 18a and 18b are arranged near the sensor magnet at a predetermined interval in the rotational direction of the rotary shaft. When the drive motor 25 is rotated, each of the magnetic sensors 18a and 18b sends a pulse-like output signal to a detection circuit 19. The output signal (pulse signal) from each of the magnetic sensors 18a and 18b has a predetermined phase difference. The detection circuit 19 shapes the waveform of each output signal (pulse signal) and sends the shaped signal to the control section 13.

Based on the period of the output signal from each of the magnetic sensors 18a and 18b received via the detection circuit 19, the control section 13 detects the rotational period (rotational speed) of the drive motor 25.

That is, when receiving ON signals from the preselect switch SW2 and the tilt open switch SW3 as the result of the operation of those switches, the control section 13 increments the count number of the rotational period of the drive motor 25 by "1" every period of the output signal (pulse signal) based on, for example, the rising edge of that signal. When receiving ON signals from the preselect switch SW2 and the tilt close switch SW4 as the result of the operation of those switches, the control section 13 decrements the count number incremented at the time of opening the roof glass 24 by "1" every period of the output signal (pulse signal). Then, the control section 13 detects the position of the roof glass 24 according to the count number.

The position of the origin needed to determine the correlation between the roof glass 24 and the count number is set by setting the count value to "0" by operating the tilt close switch SW4 for a predetermined time or by a predetermined number of times in such a way as to actuate the roof glass 24 further in the closing direction with the roof glass 24 placed in, for example, the mechanical limit on the fully closing side.

The control section 13 detects the rotational direction of the drive motor 25 in accordance with the phase difference of each output signal (pulse signal) and detects the moving direction of the roof glass 24 based on the detection of the rotational direction of the drive motor 25.

When a value computed from the rotational period (rotational speed) of the drive motor 25 becomes longer (slower) than a predetermined decision value while the roof glass 24 is closing, the control section 13 determines that the rotational period has become longer (the rotational speed has become slower) as a result of a foreign matter caught between the roof glass 24 and the roof panel 22. Then, the control section 13 rotates the drive motor 25 reversely to release the foreign matter caught in the roof glass 24 during closing and opens the roof glass 24 by a specified amount (predetermined count number). At this time, the control section 13 switches the decrementing of the count number to incrementing based on the reverse rotation of the drive motor 25.

Figure 4:
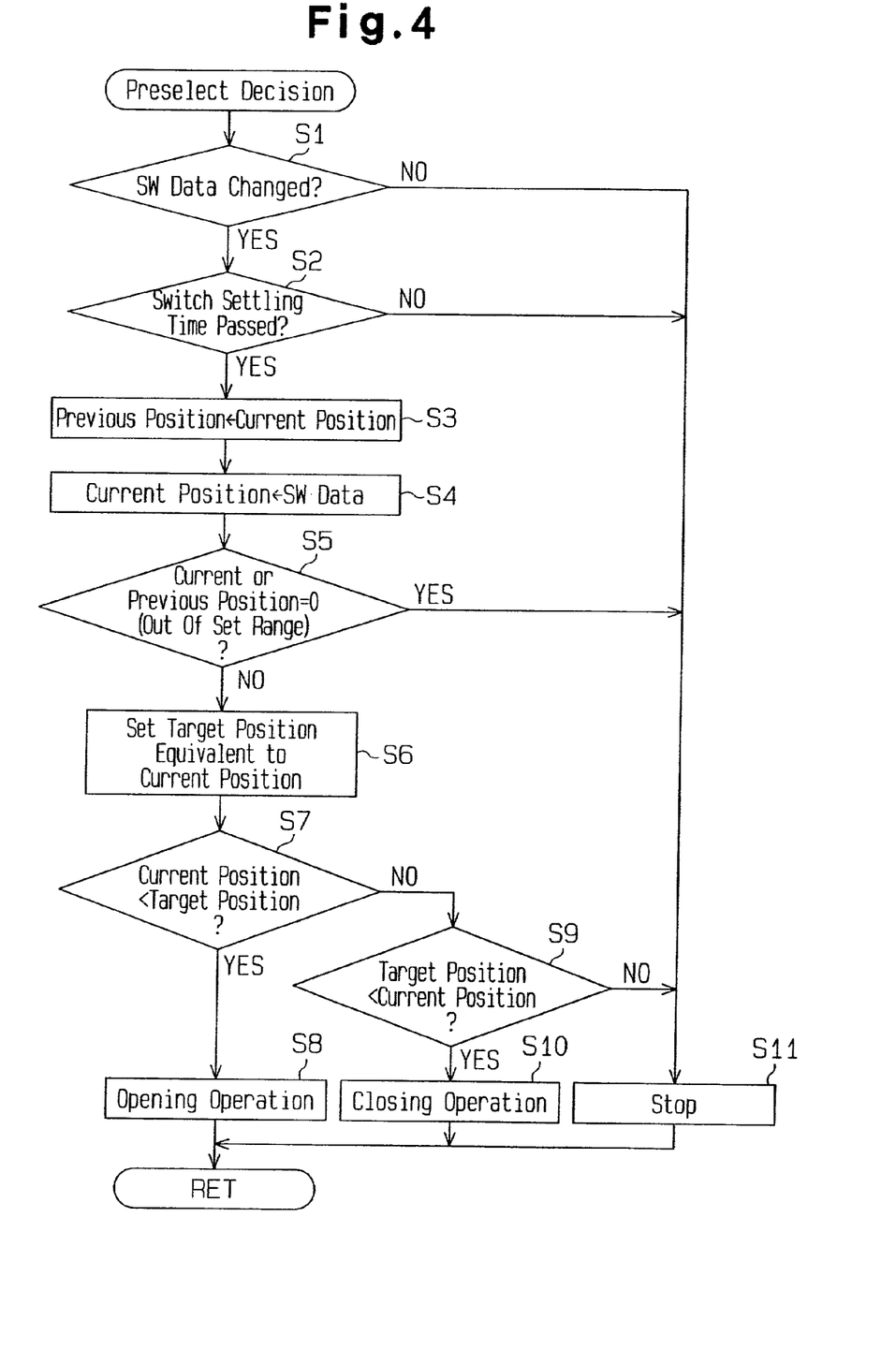
FIG. 4 is a flowchart illustrating the flow of a process of a control section which is associated with the preselect switch.
Figure 5:
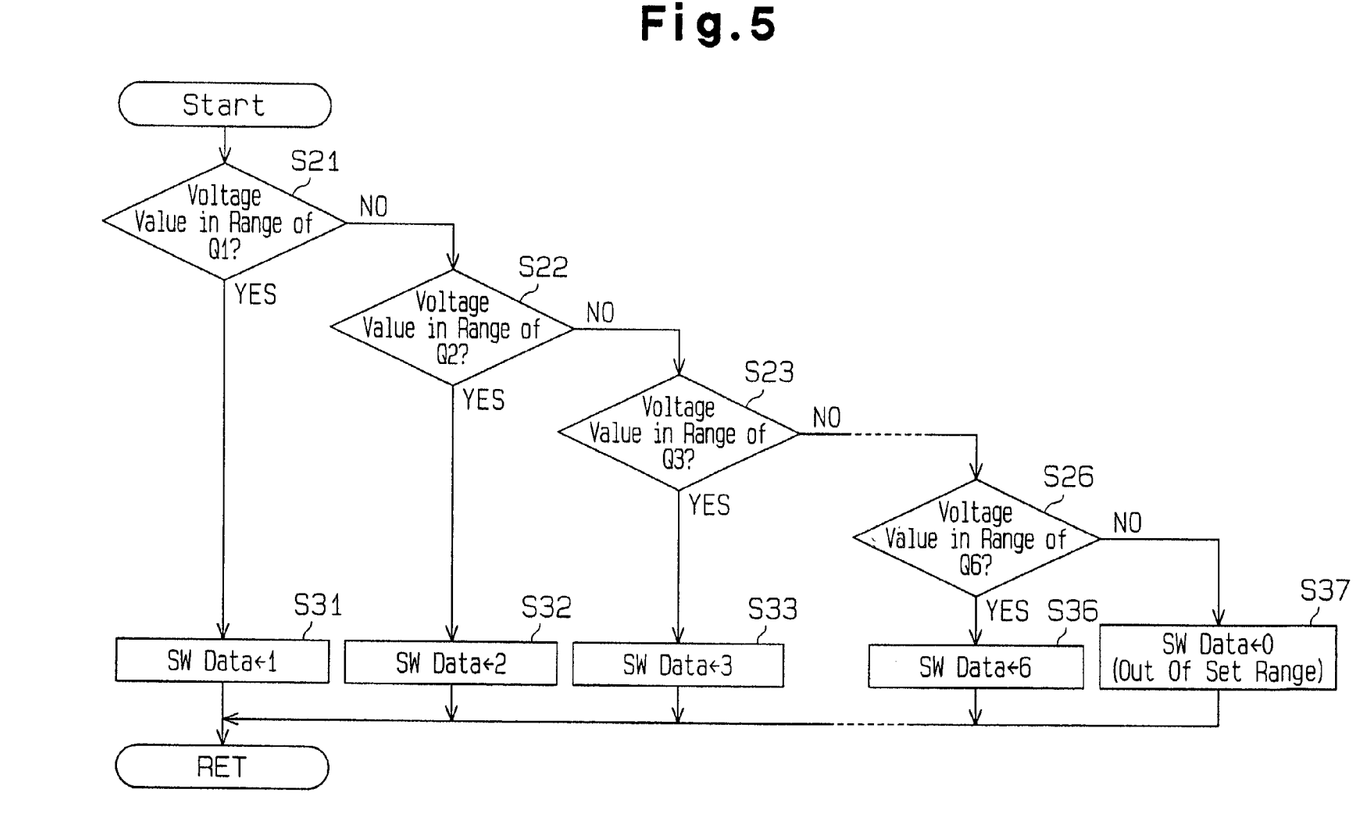
FIG. 5 is a flowchart illustrating the flow of a process of the control section which is associated with the generation of switch data.

Next, the process the control section 13 executes based on the operation of the preselect switch SW2 will be discussed according to a flowchart in FIG. 4. In step S1, the control section 13 determines whether or not switch data (SW data) has changed by the rotational operation of the preselect switch SW2. The SW data is set as shown in FIG. 5.

In steps S21 to S26, the control section 13 determines whether or not the value of the input switch voltage Vs lies within any of the allowable ranges corresponding to the positions Q1 to Q6. Note that as steps corresponding to the two positions Q4 and Q5 are the same as steps S21 to S23 and S26 corresponding to the remaining positions, they are omitted in FIG. 5.

If the value of the switch voltage Vs lies within any of the allowable ranges corresponding to the positions Q1 to Q6, the control section 13 proceeds to the corresponding one of steps S31 to S36 and rewrites the SW data with one of values "1" to "6" corresponding to the selection positions Q1 to Q6. If the value of the switch voltage Vs does not correspond to any of the selection positions Q1 to Q6, on the other hand, the control section 13 proceeds to step S37 to rewrite the SW data with a value "0" corresponding to the non-allowable ranges.

If the SW data has not changed in the step S1, the control section 13 determines that the preselect switch SW2 has not been operated and goes to step S11 to keep the drive motor 25 stopped. If the SW data has been changed, on the other hand, the control section 13 determines that the preselect switch SW2 has been operated and goes to step S2.

In step S2, the control section 13 determines whether or not a predetermined switch settling time (e.g., 500 ms) has passed since the change in SW data. The SW data is changed every time the preselect switch SW2, when operated, passes each of the selection positions Q1 to Q6 or the non-allowable range therebetween. In a case where the SW data is changed in the switch settling time, therefore, the control section 13 determines that the preselect switch SW2 is being operated and keeps the drive motor 25 stopped in step S11.

In a case where the switch settling time has passed after the change in SW data, on the other hand, the control section 13 determines that the operation of the preselect switch SW2 has been completed and the selection position has been settled and proceeds to the next step S3.

In step S3, the control section 13 moves position data of the selection position settled in the previous routine from a current position register in the control section 13 to a previous position register (neither shown) to empty the current position register. Next, in step S4, the control section 13 writes in the current position register the SW data of the selection position settled in the current routine.

In step S5, the control section 13 determines whether or not the current or previous position data in the corresponding resistors is "0". When the current or previous position data is "0", the control section 13 keeps the drive motor 25 stopped in step S11.

When the current or previous position data (SW data) is settled to "0", the control section 13 determines that an abnormality has occurred. This is because when the resistance of the voltage-dividing resistor in the variable resistor 20 changes due to electromigration or the like or the switch voltage Vs of the preselect switch SW2 is changed due to the influence of an external electromagnetic wave, the position data is kept "0" over a long period of time of 500 ms or longer and the decision in step S5 is finally led to YES.

In a case where the switch voltage Vs changes due to electromigration, the external electromagnetic wave or the like, the position data may be changed to any of the normal position "1" to "6" from "0" even though the preselect switch SW2 is not operated. In this case, if the actuation of the roof glass 24 is controlled based only on the current position data, the control section 13 may erroneously determine that the preselect switch SW2 has been operated even though the switch SW2 is not operated actually. In this case, the roof glass 24 is actuated against the intention of the user.

On the other hand, if it is determined that an abnormality has occurred when at least one of the current and previous position data becomes "0" and the drive motor 25 is kept stopped as done in the present embodiment, the roof glass 24 is prevented from being actuated against the intention of the user.

When both the current and previous position data are not "0" in the step S5, the control section 13 determines that the preselect switch SW2 has been turned from a predetermined normal position to another normal position and proceeds to step S6.

In step S6, the control section 13 sets the target position of the roof glass 24 which is equivalent to the current position data, then goes to step S7. In step S7, when the value of position data corresponding to the target position is larger than the value of position data corresponding to the current position of the roof glass 24 and the target position is on the slide fully-open side to the current position of the roof glass 24, the control section 13 drives the drive motor 25 to open the roof glass 24 in step S8.

On the other hand, when the value of the position data corresponding to the target position is smaller than the value of the position data corresponding to the current position of the roof glass 24 and the target position is on the fully-closed side to the current position of the roof glass 24, the control section 13 advances to step S9 and step S10 and drives the drive motor 25 to close the roof glass 24 in the step S10.

When the value of the position data corresponding to the target position is equal to the value of the position data of the current position of the roof glass 24 and the target position is the same as the current position of the roof glass 24, the control section 13 advances to step S11 from step S9 and keeps the drive motor 25 stopped.

According to the present embodiment, as described the above, when both the current and previous position data are not "0", the control section 13 determines that the preselect switch SW2 has been rotated from a predetermined normal position to another normal position and actuates the roof glass 24 according to that rotation. Even if the value of the switch voltage Vs changes due to electromigration, an external electromagnetic wave or the like and the position data is changed from "0" to any of the normal values "1" to "6", although the preselect switch SW2 is not operated, it is possible to suppress the actuation of the roof glass 24, thereby reducing the awkward feeling the user would otherwise have.

As apparent from the above, the sunroof apparatus according to the present embodiment has the following characteristics.

(1) In the present embodiment, when a predetermined time passes since the switch voltage Vs output from the preselect switch SW2 has changed to any of a plurality of allowable ranges including the voltage values "$V_{P1}$" to "$V_{P6}$" corresponding to the selection positions Q1 to Q6 of the switch SW2 and the non-allowable ranges that exist between the allowable ranges, the selection position of the switch SW2 is settled based on the switch voltage Vs.

In a case where the previous and current position data of the switch SW2 are both settled as normal position data, the roof glass 24 is allowed to move to the position where one of the positions P1 to P6 of the roof glass 24 corresponds to the currently settled one of the selection positions Q1 to Q6 of the switch SW2.

When the switch voltage Vs has changed due to the occurrence of electromigration, an external electromagnetic wave or the like, position data is settle in the non-allowable range of the switch voltage Vs as mentioned above.

Therefore, the roof glass 24 is allowed to move to the position corresponding to the currently settled selection position of the switch SW2 when the previous and current position data of the switch SW2 are both settled as normal position data, whereas the actuation of the roof glass 24 is inhibited when the previous and current position data of the switch SW2 are settled as position data in the non-allowable range. Even if the voltage value of the switch SW2 changes gradually over a long period due to the influence of electromigration, an external electromagnetic wave or the like, therefore, an erroneous detection that the switch SW2 has been operated is avoided and the roof glass 24 can be prevented from being actuated against the intention of the user.

The embodiment of the present invention may be modified as follows.

Although the variable resistor 20 is used for the preselect switch SW2 in the above-mentioned embodiment, a plurality of resistors having different resistances may be provided for the respective selection positions. Alternatively, the switch SW2 may be a slide type switch instead of the rotary switch.

Although the magnetic sensors 18a and 18b comprised of Hall elements are used for the rotary sensor in the embodiment, magnetic resistor elements whose resistances change in accordance with a change in magnetic field may be used. Besides those magnetic sensors, an optical rotary sensor may be used or a contact type rotary sensor which uses slide contacts may be used as well.

In the embodiment, while the ON signal is input to the control section 13 from the tilt open switch SW3 or the tilt close switch SW4, the control section 13 supplies the drive voltage to the drive motor 25 for manual actuation to actuate the roof glass 24 according to that ON signal. Instead, auto actuation may be used to supply the drive voltage to the drive motor 25 to keep moving the roof glass 24 to the target position even if the ON signal is input to the control section 13 from the tilt open switch SW3 or the tilt close switch SW4 and then switched to the OFF signal. The target position in this case is the fully-open position in case of a tilt opening signal and the fully-closed position in case of a tilt closing signal.

Although the drive motor 25 and the control circuit 11 are constructed integrally as the drive unit 10 in the embodiment, the control circuit 11 may be provided as separated from the drive motor 25.

Although the present invention is embodied into a sunroof apparatus which performs both the slide opening/closing operation and the tilt opening/closing operation in the embodiment, the present invention may be embodied into a sunroof apparatus which performs only the slide opening/closing operation.

Although the present invention is embodied into a sunroof apparatus which uses a roof glass as a movable member in the embodiment, the present invention may be embodied into other types of apparatuses, such as a power window apparatus which uses a window glass as a movable member and a slide door apparatus which uses a slide door as a movable member.

What is claimed is:

1. A control apparatus for a movable member, comprising:
   a movable member, wherein said movable member is movable between a fully-open position to fully open an opening of a frame and a fully-closed position to fully close said opening of said frame and is selectively placeable in a plurality of positions between said fully-open position and said fully-closed position;
   a drive motor for actuating said movable member;
   a detection device which detects a position of said movable member;
   a selection switch which is operated to place said movable member in any one of said plurality of positions, wherein said selection switch is changed over to selection positions corresponding to said plurality of positions and outputs voltages of different levels in accordance with said selection positions; and
   control means which controls said drive motor to actuate said movable member in accordance with said position of said movable member detected by said detection device and a selection position of said selection switch position, and performs operations of:
   specifying the selection position of said selection switch when an output voltage from said selection switch is determined to be included in any of allowable ranges predetermined respectively for said selection positions of said selection switch, wherein non-allowable ranges are set among said allowable ranges determined respectively for said selection positions of said selection switch;
   settling the selection position of said selection switch when said specified selection position has not changed even when a predetermined time passes after specifying of said selection position of said selection switch;
   permitting actuation of said movable member to a position corresponding to said selection position of said selection switch settled at a time of making a current decision when said selection position which has been settled at a time of making said current decision and a selection position which has been settled at a time of making a previous decision satisfy predetermined; and
   keeping the drive motor stored when the output voltage from said selection switch is determined to be included in any of the non-allowable ranges and the selection position of said selection switch is settled at the time of making the current decision or the output voltage from said selection switch during the previous decision is determined to be included in any of the non-allowable ranges and the selection position of said selection switch was settled at the time of making the previous decision.

2. The control apparatus for a movable member according to claim 1,
   wherein said control means generates numerical data corresponding to said allowable ranges and said non-allowable ranges based on said output voltage from said selection switch and specifies and settles the selection position of said selection switch based on that numerical data.

3. The control apparatus for a movable member according to claim 2, wherein numerical data of an integer equal to or greater than 1 is assigned to each of said allowable ranges corresponding to said selection positions of said selection switch and numerical data of zero is assigned to each of said non-allowable ranges, and
   wherein, when none of said numerical data of those selection positions which have been settled at a time of making said current decision and at a time of making said previous decision are zero, actuation of said movable member is permitted.

4. A control apparatus for a roof glass, comprising:
   a roof glass, wherein said roof glass is movable between a fully-open position to fully open a skylight of a vehicle and a fully-closed position to fully close said skylight and is selectively placeable in a plurality of positions between said fully-open position and said fully-closed position;
   a drive motor for actuating said roof glass;
   a detection device which detects a position of said roof glass;
   a selection switch which is operated to place said roof glass in any one of said plurality of positions, wherein said selection switch is changed over to selection positions corresponding to said plurality of positions and outputs voltages of different levels in accordance with said selection positions; and
   control means which controls said drive motor to actuate said roof glass in accordance with said position of said roof glass detected by said detection device and a selection position of said selection switch position, and performs operations of:
   specifying the selection position of said selection switch when an output voltage from said selection switch is determined to be included in any of allowable ranges predetermined respectively for said selection positions of said selection switch, wherein non-allowable ranges are set among said allowable ranges determined respectively for said selection positions of said selection switch;
   settling the selection position of said selection switch when said specified selection position has not changed even when a predetermined time passes after specifying of said selection position of said selection switch;
   permitting actuation of said roof glass to a position corresponding to said selection position of said selection switch settled at a time of making a current decision when said selection position which has been settled at a time of making said current decision and a selection position which has been settled at a time of making a previous decision satisfy predetermined conditions; and
   keeping the drive motor stopped when the output voltage from said selection switch is determined to be included in any of the non-allowable ranges and the selection position of said selection switch is settled at the time of making the current decision or the output voltage from said selection switch during the previous decision is determined to be included in any of the non-allowable ranges and the selection position of said selection switch was settled at the time of making the previous decision.

5. The control apparatus for a roof glass according to claim 4,
   wherein said control means generates numerical data corresponding to said allowable ranges and said non-allowable ranges based on said output voltage from said selection switch and specifies and settles the selection position of said selection switch based on that numerical data.

6. The control apparatus for a roof glass according to claim 5, wherein numerical data of an integer equal to or greater than 1 is assigned to each of said allowable ranges corresponding to said selection positions of said selection switch and numerical data of zero is assigned to each of said non-allowable ranges, and wherein, when none of said numerical data of those selection positions which have been settled at a time of making said current decision and at a time of making said previous decision are zero, actuation of said roof glass is permitted.

7. A control method for placing a movable member, which is movable between a fully-open position to fully open an opening of a frame and a fully-closed position to fully close said opening of said frame and is selectively placeable in a plurality of positions between said fully-open position and said fully-closed position, based on an operation of a selection switch which outputs voltages of different levels in accordance with said selection positions, said method comprising the steps of:

specifying the selection position of said selection switch when an output voltage from said selection switch is determined to be included in any of allowable ranges predetermined respectively for said selection positions of said selection switch, wherein non-allowable ranges are set among said allowable ranges determined respectively for said selection positions of said selection switch;

settling the selection position of said selection switch when said specified selection position has not changed even when a predetermined time passes after specifying of said selection position of said selection switch; and permitting actuation of said movable member to a position corresponding to said selection position of said selection switch settled at a time of making a current decision when said selection position which has been settled at a time of making said current decision and a selection position which has been settled at a time of making a previous decision satisfy predetermined conditions; and keeping the drive motor stopped when the output voltage from said selection switch is determined to be included in any of the non-allowable ranges and the selection position of said selection switch is settled at the time of making the current decision or the output voltage from said selection switch during the previous decision is determined to be included in any of the non-allowable ranges and the selection position of said selection switch was settled at the time of making the previous decision.

8. The control method for a movable member according to claim 7, wherein numerical data corresponding to said allowable ranges and said non-allowable ranges is generated based on said output voltage from said selection switch and the selection position of said selection switch is specified and settled based on that numerical data.

9. The control method for a movable member according to claim 8, wherein numerical data of an integer equal to or greater than 1 is assigned to each of said allowable ranges corresponding to said selection positions of said selection switch and numerical data of zero is assigned to each of said non-allowable ranges, and wherein, when none of said numerical data of those selection positions which have been settled at a time of making said current decision and at a time of making said previous decision are zero, actuation of said movable member is permitted.

10. A control method for placing a roof glass, which is movable between a fully-open position to fully open a skylight of a vehicle and a fully-closed position to fully close said skylight and is selectively placeable in a plurality of positions between said fully-open position and said fully-closed position, based on an operation of a selection switch which outputs voltages of different levels in accordance with said selection positions, said method comprising the steps of:

specifying the selection position of said selection switch when an output voltage from said selection switch is determined to be included in any of allowable ranges predetermined respectively for said selection positions of said selection switch, wherein non-allowable ranges are set among said allowable ranges determined respectively for said selection positions of said selection switch;

settling the selection position of said selection switch when said specified selection position has not changed even when a predetermined time passes after specifying of said selection position of said selection switch;

permitting actuation of said roof glass to a position corresponding to said selection position of said selection switch settled at a time of making a current decision when said selection position which has been settled at a time of making said current decision and a selection position which has been settled at a time of making a previous decision satisfy predetermined conditions; and keeping the drive motor stopped when the output voltage from said selection switch is determined to be included in any of the non-allowable ranges and the selection position of said selection switch is settled at the time of making the current decision or the output voltage from said selection switch during the previous decision is determined to be included in any of the non-allowable ranges and the selection position of said selection switch was settled at the time of making the previous decision.

11. The control method for a roof glass according to claim 10, wherein numerical data corresponding to said allowable ranges and said non-allowable ranges is generated based on said output voltage from said selection switch and the selection position of said selection switch is specified and settled based on that numerical data.

12. The control method for a roof glass according to claim 11, wherein numerical data of an integer equal to or greater than 1 is assigned to each of said allowable ranges corresponding to said selection positions of said selection switch and numerical data of zero is assigned to each of said non-allowable ranges, and wherein, when none of said numerical data of those selection positions which have been settled at a time of making said current decision and at a time of making said previous decision are zero, actuation of said roof glass is permitted.

* * * * *

UNITED STATES PATENT AND TRADEMARK OFFICE
CERTIFICATE OF CORRECTION

PATENT NO. : 7,030,509 B2 Page 1 of 1
APPLICATION NO. : 10/213901
DATED : April 18, 2006
INVENTOR(S) : K. Okada, Y. Toyoda and T. Nakamura It is certified that error appears in the above-identified patent and that said Letters Patent is hereby corrected as shown below:

Column 9, line 50, replace "stored" with --stopped--

Signed and Sealed this

Eighth Day of August, 2006

JON W. DUDAS
*Director of the United States Patent and Trademark Office*